Dec. 20, 1966    J. MATERYN    3,292,963
HOT CAN HANDLING IMPLEMENT
Filed Aug. 21, 1962
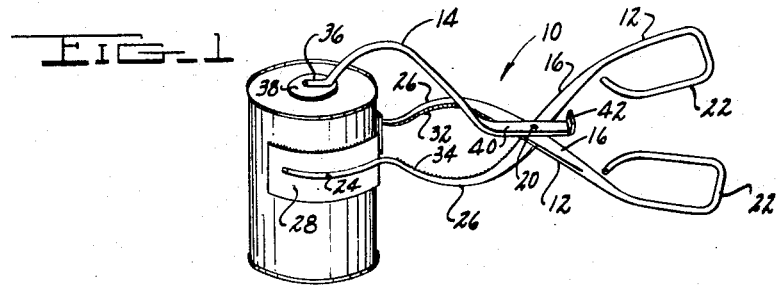
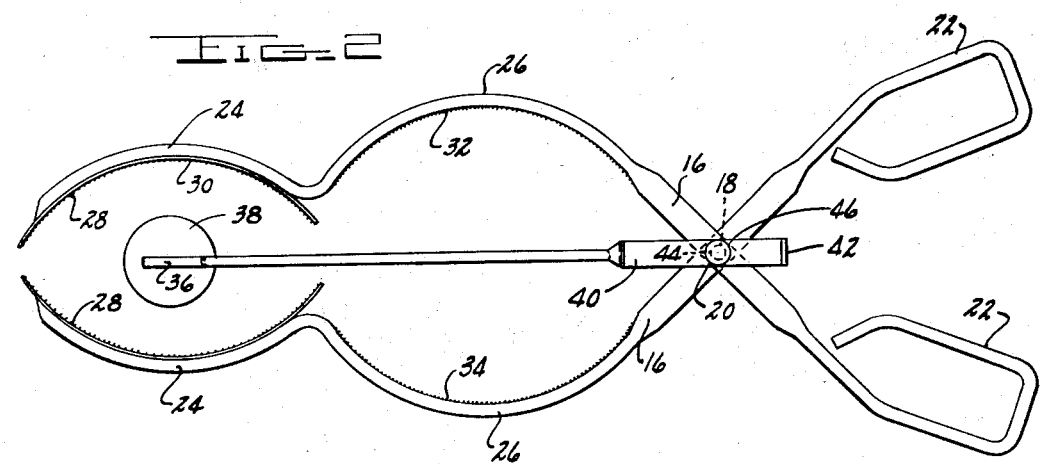
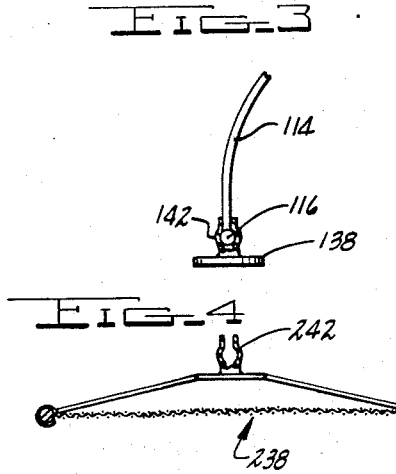
INVENTOR.
JENNY MATERYN
BY
ROBERT H. ELLIOTT United States Patent Office
3,292,963
Patented Dec. 20, 1966

3,292,963
HOT CAN HANDLING IMPLEMENT
Jenny Materyn, 2013 Mayburn Ave.,
Dearborn, Mich. 48128
Filed Aug. 21, 1962, Ser. No. 218,364
5 Claims. (Cl. 294—29)

The present invention relates to new and useful improvements in hand tools and more particularly to a new and improved hand tool used for the manipulation of cylindrical objects in a very hot area.

Throughout the years, people have been cooking preserved food, both indoors as well as out. When using conventional implements, such as pots and pans, on a stove or hot plate, no particular problem exists, other than the necessity of cleansing the various pots and pans after usage. The amount of work involved is dependent on the number of cooking utensils used.

While this is true for normal indoor cooking, a different situation presents itself when one turns to cooking out-of-doors, as in the case of a barbeque. Because of the size and shape of a barbeque grill and its large heating area, it is extremely difficult to position pots and pans thereon to avoid heating or burning of the handles. In addition, when the pots are properly positioned, considerable discoloration of the various utensils is encountered, which discoloration is very difficult to remove. Because of the extra work involved, outdoor barbeques are frequently thought of as being very distasteful and objected to by male and female alike.

To solve this problem and to make outdoor cooking more enjoyable, the present invention was developed, and with its use, the necessity of using pots and pans on the outdoor grill is virtually eliminated. This is accomplished by heating the food to be consumed in the container in which it was originaly processed, namely the "tin can." One merely opens the disposable "tin can" and places same on the grill for heating. The lid is cut from the can and repositioned so as to act as a cover, thereby retaining the heat within the can during the heating process. When the heating is completed, and it is necessary to drain off the liquid in the heated can, the can is merely inverted using the new hand tool, while the arcuate, magnetic finger retains the cover in the can, thereafter the cover is readily removed with the magnet when the can is released. The can is then re-engaged and the contents placed in a dish.

With the foregoing in mind, it will be readily appreciated that it is a primary object of the present invention to provide an inexpensive, durable hand tool which will eliminate the necessity of using pots and pans on a barbeque grill and in so doing make possible the use of disposable "tin cans" which can be handled with ease with the hand tool of the present invention.

Another object of the invention is the provision of a hand tool wherein the lid of the "tin can" being heated can be removed and replaced without danger of being burned.

Still another object of the present invention is the provision of a new and useful hand tool which can be used with equal effectiveness on cans of various sizes.

Another object of the invention is the provision of a hand tool for the manipulation of hot objects, wherein a wire strainer is detachably secured thereto.

Still another object of the invention is the provision of a hand tool which can be used for removing mason jar covers and the like.

These and other objects can be accomplished by the provision of a hand tool used for the manipulation of tin cans on a hot grill and having a pair of generally symmetrical scissor like arms; an opening of round configuration symmetrically located in each of said arms intermediate the ends thereof; an arcuate finger member having two generally flat end portions in substantially parallel relationship; an opening of round configuration in the first flat end of said arcuate finger member; a magnet secured to the second flat end portion of said arcuate finger member; said round openings in said arms positioned in alignment with the round opening in the first flat end of said arcuate finger member, said arms and said arcuate finger member pivotally joined with a cylinlindrical member disposed through said openings; a thumb piece integral with said arcuate finger member and adjacent the pivotal joint; a finger loop on one end of each of said arms and a plurality of gripping means on the opposite end thereof; said gripping means having serrations on the inner surfaces thereof; movement of said finger loops in one direction causing said grip means to engage a tin can, while movement in the opposite direction releases the tin can, the arcuate finger member being used to retain and the magnet thereon to remove the loose tin can lid.

Other objects of this invention will appear in the following description and appended claims, reference being had to the accompanying drawings forming a part of this specification wherein like reference characters designate corresponding parts in the several views.

In the drawings:

FIGURE 1 illustrates a perspective view of the present invention when used with a tin can.

FIGURE 2 shows a plan view of the invention.

FIGURE 3 illustrates a modified form of the present invention, wherein a magnet is detachably secured to the arcuate finger member with a ball and socket device.

FIGURE 4 shows a strainer which is adapted to be substituted for the magnet illustrated in the modified form of the invention shown in FIGURE 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

Referring to the drawings FIGURE 1 illustrates a complete assembly 10 of the present invention, as used with a tin can. The complete unit assembly 10 is made up of three basic parts, namely a pair of generally symmetrical arms 12 and an arcuate member 14 in the form of a finger, to which one end thereof is pivotally secured to the arms 12.

Each of the arms 12 are of the same configuration and made from round wire, with a flat section thereon intermediate the ends and identified by numeral 16. Centrally located in the flat area 16 are round openings 18 which are adapted to receive a pivot member 20. One end of the arm 12 has a finger loop 22 integral therewith, while the opposite end thereof has formed thereon a pair of arcuate sections 24 and 26. The outermost arcuate section has secured thereto, a grip pad 28 which is of the same configuration as the arcuate section 24. A similar shaped pad is located on the second arm also. The inner surface 30 of grip pad 28 has a plurality of serrations thereon, to insure adequate and proper contact with the outer surface of the can. The inner surfaces 32 and 34 of the other arcuate section 26 is also provided with serrations. This section being used for engaging and removing mason jar lids and the like.

Interposed between the arms 12 and atop of the flat sections 16 is located the arcuate finger member 14. The outermost end 36 of the arcuate finger 14 has a flat section thereon to which is secured a permanent magnet 38. While the inner end 40 is flat, with the end section 42 turned at right angles thereto to form a thumb piece. A round opening 44 is provided in the flat portion 40 of the arcuate finger member 14. The round openings 18 in the arms 12 are positioned in alignment with opening 44 in the finger member 14. The three parts are then joined by a rivet 46 or any other suitable means, to form a pivotable structure.

FIGURE 3 of the drawings illustrates a modified form of the present invention, wherein a ball 116 is provided on the outermost end 114 of the arcuate finger member. The ball 116 is adapted to engage a resilient socket 142 mounted on a permanent magnet 138. By such construction, a strainer 238, such as shown in FIGURE 4 of the drawings can be adapted for usage with the modified form of the present invention, thereby adding to the utility thereof. The resilient socket 242 is of the same general construction as socket 142.

From the foregoing description, it is apparent that I have invented a new and useful tool, which when used will save time, as well as burned fingers. Outdoor cooking will be a pleasure enjoyed by all. The present invention in combination with paper plates is a luxury which no family or camping group should be without. Incidently, this is an invention which the rogues of the road, commonly known as "hobos," will find indispensable.

Having thus described my invention, I claim:

1. In a hand tool for use in the manipulation of hot objects, the combination of, a pair of generally symmetrical scissor like arms; an opening of round configuration symmetrically located in each of said arms intermediate the ends thereof; an arcuate finger member having two generally flat end portions in substantially parallel relationship; an opening of round configuration in the first flat end of said arcuate finger member; a magnet secured to the second flat end portion of said arcuate finger member; said round openings in said arms positioned in alignment with the first round opening in the first flat end of said arcuate finger member, said arms and said arcuate finger member pivotally joined with a cylindrical rivet disposed through said openings; a finger loop on one end of each of said arms and gripping means on the opposite ends thereof; movement of said finger loops in one direction causing said gripping means to engage an object, while movement thereof in the opposite direction releases said object.

2. A device as in claim 1, wherein said magnet is detachably secured to the end of said arcuate finger member with a ball and socket device.

3. In a hand tool for the manipulation of heated objects, the combination of, a pair of generally symmetrical scissor like arms; an opening located in each of said arms intermediate the ends thereof; an arcuate finger member; an opening in one end of said arcuate finger member; said opening in said arcuate finger and said openings in said arms positioned in alignment to receive a rivet therein to form a pivotal assembly; a thumb piece integral with said arcuate finger, adjacent said pivotal joint; finger loops on one end of each of said arms; a pair of arcuate gripping means, one located on each of the opposite ends of said arms; movement of said finger loops in one direction causing said gripping means to engage an object, while movement in the opposite direction releases said object; and a magnet on the opposite end of said arcuate finger engages the top of said object.

4. A device as in claim 3, wherein said arcuate gripping means have serrations on the inside surfaces thereof.

5. In a hand tool used for the manipulation of hot objects on a grill, the combination of, a pair of generally symmetrical scissor like arms; an opening in each of said arms intermediate the ends thereof and symmetrically positioned; an arcuate finger member having two generally flat end portions in substantially parallel relationship; an opening in the first flat end of said arcuate finger member; a magnet secured to the second flat end portion of said arcuate finger member; said opening in said arcuate finger member positioned in alignment with the openings in said arms and pivotally joined with a cylindrical rivet disposed therethrough; a thumb piece integral with said arcuate finger member and adjacent said pivotal joint; a finger loop on one end of each of said arms; a plurality of gripping means on the opposite ends thereof; said gripping means having serrations on the inner surfaces thereof for engagement with the hot object; movement of said finger loops in one direction causing said grip means to engage said hot object, while movement in the opposite direction releases said hot object, with the arcuate finger being used to position one end of the hot object.

References Cited by the Examiner

UNITED STATES PATENTS

| 938,258 | 10/1909 | Lyzotte | 294—33 |
| 1,204,026 | 12/1916 | Pritchard | 210—469 |
| 1,325,613 | 6/1919 | Beebe | 210—469 |
| 1,517,776 | 7/1924 | Fisher | 294—28 |
| 2,772,381 | 6/1951 | Rhodes | 294—65.5 |
| 2,990,213 | 6/1959 | Kolacinski | 294—118 |

SAMUEL F. COLEMAN, *Primary Examiner.*

ANDRES H. NIELSEN, WILLIAM B. LABORDE,
*Examiners.*